Patented Feb. 12, 1924.

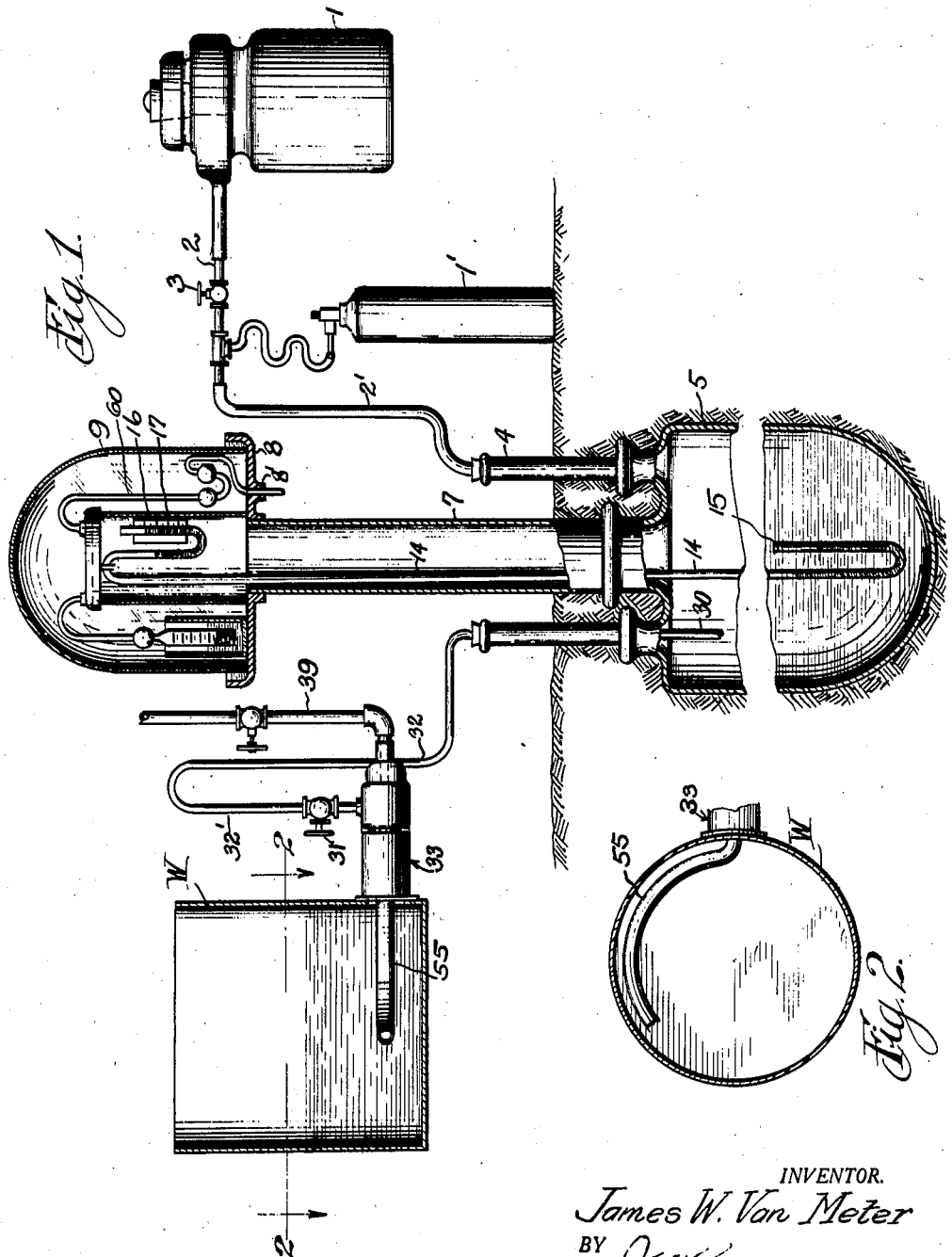

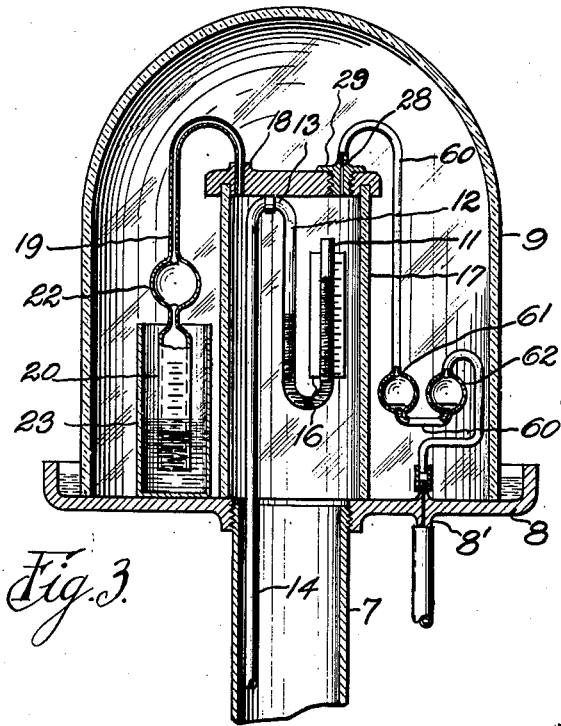

1,483,256

UNITED STATES PATENT OFFICE.

JAMES W. VAN METER, OF SAN FRANCISCO, CALIFORNIA, ASSIGNOR TO JUSTINIAN CAIRE COMPANY, A CORPORATION OF CALIFORNIA.

METHOD OF AND MEANS FOR CHLORINATING FLUIDS.

Application filed January 20, 1922. Serial No. 530,637.

*To all whom it may concern:*

Be it known that I, JAMES W. VAN METER, a citizen of the United States, of 573 Market Street, San Francisco, in the county of San Francisco and State of California, have invented new and useful Improvements in a Method of and Means for Chlorinating Fluids, of which the following is a specification.

This invention relates to a method of and means for chlorinating liquids and other substances. It has the object of facilitating the chlorination of materials for cleaning, bleaching, or sterilizing purposes, as, for instance, in laundries, flour mills and so forth, although the method and means may readily be adapted within the scope of the invention to other purposes wherever a chlorination of substances, (designated "fluids" in the following specification) is desired.

I have had favorable results with steam at different temperatures—also with compressed air, preferably in a moist state. I do not wish to confine myself to either, but to any expansive agent which disseminates and diffuses chlorine forming my vapor product.

It will be seen that I gain many advantages by introducing my chlorine in the form of a vapor or mixture instead of introducing same in a pure or dry state. By so doing I get a much quicker absorption with the fluids to be treated.

The manner whereby I control the amount of chlorine required indirectly by controlling the rate of flow of the expansive agent, instead of the chlorine, entirely dispenses with the intricate system of compensators, reduction and high pressure chlorine valves, and absorption towers, which have been necessary heretofore in installation, whereby dry chlorine has been used under pressure for the purpose of water sterilization and the treatment of fluids and so forth.

Another object of the invention is to enhance the safety of the operations to be carried out with the chlorine, by causing the gas to be introduced through suction or at a pressure below that pressure, at which it is generated or stored in contradistinction from known methods and devices which relied on high pressure and which therefore also suffered from the defect of a gradual decrease of pressure in proportion to the evacuation of the chlorine receptacle.

It is also an object of the invention to effect a thorough diffusion of the fluid to be treated by the chlorine, and to accomplish this diffusion without compelling the material to be treated to expand in a film-like layer over material interposed in the path of the fluid or chlorine. It is an object to effect a thorough mixture of the gaseous and liquid fluids by passing one through the other, and to utilize centrifugal force for facilitating this intermixture.

I accomplish my object by introducing the chlorine at a more or less elevated temperature to enhance its effect, and to utilize a heated vapor, as, for instance, steam, for the purposes of not only acting as carrier and diffusor of the gas, but also as a heating means for the same, and as a sterilizing agent for the fluid.

In connection with this step of the improved method it is also an object to improve the introduction of the chlorine by causing the accelerated condensation of the vaporous mixture containing the gas to further increase a thorough intermixture of the ingredients.

Another object of the invention is to improve the control or supervision of the operative steps, and to render their control sufficiently flexible to adapt the quantity of the gas to be introduced to the varying operating conditions of the establishment in which the improved method and means are to be utilized.

Another object of the invention is to be seen in the provision of a gas container which may readily be placed underground to prevent the escape of obnoxious gases under pressure, and which also increases the safety and resistance against explosions, whereby, however, a novel arrangement of readily accessible and visible control devices indicate to the operator at any time the volume or pressure conditions of the chlorine gas.

With these and numerous other objects in view which will become apparent from the following description, a combination of steps constituting the method referred to and a means for carrying out the method are described by way of example in the following specification, reference being made to the accompanying drawing, wherein—

Figure 1 is a diagrammatic view of an apparatus for carrying out the method;

Figure 2 is a horizontal sectional view of a container for the fluid to be treated, to indicate the arrangement of a conduit;

Figure 3 is a detail view of the control devices;

Figure 4 is a sectional detail view of the injector and mixing device, and

Figures 5 to 9 are details of this injector.

The method may include the step of generating the chlorine gas, as, for instance, by electrolytic processes or by the action of hydrochloric acid or binoxide of manganese or in some other way. Chlorine produced in this way may contain a certain percentage of moisture. It is, however, also within the scope of the present invention to use liquefied chlorine as supplied to the public in steel cylinders and containers, and to conduct the chlorine gas (converted by its release from the pressure contained from liquid condition into gaseous condition) to an underground deposit or receiver.

While it is thus maintained or stored within the receptacle or underground container, the quantity or volume of the stored gas may readily be ascertained by the level of a column of liquid within a graduated tube situated at a point remote from the underground receiver. The rate of flow into and out of the underground receiver may be also ascertained by the displacement of a body of liquid within a graduated tube in communication with the interior of the receiver.

A conduit from the storage receptacle extends to a zone in which a pressure lower than the pressure in the interior of the receptacle prevails, thereby causing a flow of the gas into the low pressure zone, from which the gas is carried, preferably after being heated, as, for instance by steam or other means, into the fluid to be chlorinated and is thoroughly mixed with the fluid through agitation and condensation.

The accompanying drawing shows diagrammatically as a source of chlorine a still 1 of ordinary well known character for the generation of chlorine. The chlorine produced in this still is usually in moist condition. It is conducted through a tube 2, containing a control valve 3 and hose 2', into a pipe 4, which extends into a storage receptacle 5. This receptacle may be positioned underground as indicated, and is preferably made of vitrified clay or the like, so as to resist the attacks of the chlorine. It may also be made of metal provided with a suitable protective lining. Owing to this arrangement of the storage receptacle the detrimental features which are otherwise unavoidable in the preservation of gaseous chlorine are entirely eliminated, and the entire plant becomes suitable for house installations in communities in which municipal regulations restrict the use of this agent.

Instead of generating the chlorine by the still or some other generating device, (as for instance by an electrolytic cell), an ordinary steel container 1' as supplied to the market may be used as source of chlorine and may be connected with pipe 2 through a valve controlled tubing.

The subterraneous disposal of the receptacle 5 makes it essential to provide indicating or controlling devices at a readily accessible and visible point.

The receptacle 5 is shown to communicate with a pipe or support 7 projecting above the ground, and having on its top a lateral flange 8 on which a protecting bell 9 of glass or some other transparent material rests. The engagement between the lower edge of the bell and top surface of the plate 8 may be made air tight by a suitable sealing means, as well known, thereby preventing the escape of obnoxious odors.

A vent or pipe 8' communicates with the interior of the bell to permit the entrance or discharge of air into or from the interior of the bell. A hose may be attached thereto to carry off obnoxious fumes.

Within the interior of the bell and within the inserted cup 17 a bent glass tube is supported having parallel legs 11 and 12, of which the leg 11 is open at its upper end. The two legs of this tube may be filled through the open leg 11 with a suitable liquid adapted to be displaced upon displacement of an air column with which the other leg 12 is in communication. This other leg communicates at its upper end with the bent portion 13 of a tube 14 which extends through the column to a point near the bottom of the storage receptacle. At this end the glass tube 14 also is connected with an extension or leg 15, which is disposed parallel to the tube 14. The two legs 14, 15 which are formed in this way at the lower end of the tube also may be filled to a certain height with liquid, whereby a column of air is then inclosed within the tube 14 between the two bodies of liquid at the ends of the tube. It is obvious, therefore, that, depending upon the weight of the body of chlorine within the receptacle, the body of liquid in the lower end of the tube 14 and the leg 15 will be displaced and this displacement will be transmitted to the column of air within the tube 14 and through said column of air to the liquid in the legs 11 and 12 of the tube. In this way the weight of the volume of chlorine within the interior of the receptacle may be ascertained through the gradation marks 16 at a point remote from the receptacle itself.

The rate of flow from the receptacle or to the same may be measured by means of a device which is also disposed in the interior of the bell 9. An inverted cylinder 20 open at the bottom communicates with the interior of the cup 17 through a vent 18, and has its open end immersed in a jar 23 partly filled with liquid. The pipe 19 communicating between the upper end of the cylinder 20 and the vent 18 contains a bulb or trap 22. A boss 29 has a bore 28 of exactly determined caliper and communicates therethrough with the interior of cup 17.

A pipe 60 extends from the vent 28 to the vent 8', which latter is disposed on the flange 8 supporting the bell 9. This tube contains two serially arranged bulbs 61, 62 preferably in horizontal alignment and connected at their deepest points by a tube portion 60'. These bulbs and the connecting tube portions are filled with liquid. If therefore gas or air flows in one or the other direction through tube 60 it will bubble up through the liquid in one or the other of these bulbs and thereby indicate to the operator in which direction the fluid flows.

If, for instance, air is expelled from the receptacle 5 through the introduction of chlorine the air escaping through the tube 60 will produce bubbles in upward direction in the second bulb 62 through which it passes, while upon withdrawal or escape of chlorine from the receptacle 5, the air coming in through tube 60 will produce visible bubbles passing up through bulb 61.

In this way an extremely sensitive indicator is combined with the measuring devices described, showing the direction of flow of the air or gas, and indicating by the more or less rapid movement of the bubbles the rate of flow of these fluids.

When the chlorine enters the receptacle 5 through pipe 4 a displacement of the air will occur and the air will escape through the bore 28 and from there through vent 8'. The pressure within the cup 17 acting through pipe 19 on the liquid in cylinder 20 will cause a displacement of the liquid therein, which can be ascertained on the gradation marks of the cylinder.

Upon withdrawal of chlorine from the receptacle 5 a decrease in pressure in cup 17 will cause the liquid in jar 23 to enter the cylinder 20 so as to raise its level. The chlorine itself does not pass through the measuring device, and this is of great importance.

For the purpose of introducing chlorine from the receptacle 5 preferably in vaporous heated condition, as a mixture of steam and chlorine, into the fluid to be treated, a pipe 30 extends into the receptacle 5 and is open at its lower end. This pipe which may contain a regulating valve 31 is in communication with a tube 32 and a standpipe 32' of a height corresponding to that of the container W and which terminates at a feeding device indicated as a whole at 33.

The feeding means or injector comprises a body portion in the form of a sleeve 34 having an internal thread at one end 35, and an external thread at the extension 36 which is of somewhat smaller diameter than the chamber formed by the casing 34. In threaded connection with the extension 36 a nipple 37 is located having a short central projection 38 suitable for attachment to a steam conduit 39. The source of steam is not illustrated in the drawing, but it is obvious that any suitable source may be used, and that in laundries or other establishments in which a chlorination of fluid is desired steam is readily available at any time. A conical sleeve 40 terminating in a flange 41 is pressed against a shoulder 42 when the nipple 37 is screwed home on the extension 36, this conical sleeve or nozzle 40 then projecting into the interior of the casing 34. Owing to this reduction of the cross-section through which the steam is discharged it will be discharged with relatively great force and a partial vacuum or a zone in which a relatively low pressure prevails is created adjacent the point of discharge from the nozzle 40.

The casing 34 has an inwardly projecting shoulder 43 against which another nozzle 44 is forced by means of its flange 45 when the casing is secured by its internal thread 35 on the external thread 46 of a nipple indicated as a whole at 47. This nipple comprises adjacent the threaded extension 46 a hexagonal flange 48, whereby it is rendered suitable for engagement with wrenches or similar tools, and on the opposite side of this flange 48 another threaded extension 49 projects in the opposite direction. The nipple 47 is detachably secured by means of the threaded portion 49 to a cap 50, which is fastened to the wall of the container of the fluid to be treated and communicates through the opening 51 with the interior of said container.

The term container is here used not only to indicate a receptacle having a quiescent body of fluid but is intended to indicate also containers for fluid in motion, pipe conduits or the like.

An extension 52 in communication with the threaded part 49 includes an enlarged portion provided with a plurality of openings 53 and a somewhat reduced portion 54 in alinement therewith. The fluid to be treated enters the interior of the extension through the holes 53, so that the end of the nozzle 44 projects into the fluid. The reduced portion 54 preferably is provided with spiral ribs which has the effect of agitating the mixture of steam, chlorine, and fluid in said reduced portion 54, owing to the fact that on account of these grooves a rapid spiral or whirling movement is imparted to the fluid passing through the same, and in this rapid whirling movement the heavier part of the mixture may be thrown with centrifugal force against the wall of the reduced portion 54, leaving the lighter part of the mixture or gas in the interior of the revolving mass in nozzle. This pipe extends in the form of a curved part 55 into the container to direct the flow in a circular path for revolving the introduced mass.

Owing to this arrangement a chlorinated vapor containing a sterilizing agent is, at relatively high temperature, introduced under agitation into the fluid to be treated and is during and after that introduction immediately condensed, or at least partly condensed whereby the reactions of the chlorine gas in the fluid are greatly facilitated. Owing to the control described, these reactions can be carried through for any desired length of time and the chlorination of liquids in different containers can easily be effected, by directing the tubing for carrying the chlorine from the storage receptacle to the various fluid containers. It is also obvious that in the device described the introduction and the intermixture of the chlorine with the vaporous carrier is effected by the creation of a vacuum or partial vacuum, and that it is therefore not essential to maintain the chlorine to be introduced into the fluid at a substantial pressure above atmospheric pressure.

While in the above specification reference has frequently been made to fluids to be treated, it is obvious that the method and apparatus described may also be used for the purpose of chlorinating other material, as for instance flour, as stated in the introduction, and while the conveyance of the chlorine by means of steam has been emphasized in the above, it is quite evident that any other expansive fluid, as for instance compressed air may be utilized for the same purpose, the invention being directed broadly to the chlorination of material without utilization of the pressure under which it is maintained in the steel cylinder, supplied to the market.

It will also be clearly seen from the above that a very efficient regulation of the quantity of chlorine to be introduced may be accomplished by merely regulating the quantity or the pressure of the carrier, i. e., the expansive fluid, steam or compressed air which flows through the injector.

In this way the various regulating valves or other devices for controlling the flow of chlorine and which would come directly into contact with chlorine may be dispensed with, which is obviously of great advantage not only because chlorine might attack the material of which these implements are made but also for the reason that the danger of escaping chlorine is decreased with the decrease of controlling devices present in the chlorine conduit.

I claim:

1. In a method of introducing chlorine into a fluid the step of introducing chlorine into the fluid in the form of a fluid mixture and subjecting the mixture to the action of centrifugal force.

2. In a method of chlorinating fluids the steps of storing chlorine in gaseous form, controlling the pressure and quantity of the gas, intermittently withdrawing chlorine gas from the stored quantity and conducting it to the fluid to be treated.

3. In a method of chlorinating material the steps of storing chlorine gas underground, producing a jet of fluid above ground, establishing communication between said jet of fluid and the chlorine gas and injecting said jet of fluid into the material to be treated.

4. In a device of the character described, the combination of a source of chlorine, a chlorine storage receptacle connected therewith, a container for the fluid to be treated, a conduit between said receptacle and container, and means associated with said storage receptacle for indicating the weight of the chlorine within said storage receptacle.

5. In a device of the character described, the combination of a source of chlorine, a chlorine storage receptacle connected therewith, a container for the fluid to be treated, a conduit between said receptacle and container, and means associated with said receptacle for indicating the rate of flow of chlorine to and from said receptacle.

6. In a device of the character described, the combination of a chlorine receptacle, a source of chlorine connected therewith, a container for the fluid to be treated, means for forcibly conveying the chlorine from the receptacle to the container, and means free of contact with chlorine for indicating the weight and flow conditions of chlorine within said receptacle.

7. In a device of the character described, the combination of a chlorine receptacle placed underground, a source of chlorine connected therewith, a container for the fluid to be treated, and means independent of the pressure of the chlorine for conveying the chlorine from said underground receptacle to said fluid container.

8. In a device of the character described, the combination of a container for the fluid to be treated, a receptacle containing chlorine and placed underground, a source of chlorine connected therewith, a conduit between the receptacle and container, and means above ground communicating with said chlorine receptacle for indicating weight and flow conditions of the chlorine within said receptacle.

9. In a device of the character described, the combination of a chlorine receptacle stored underground, and means accessible above ground for measuring the weight of the chlorine by the displacement of a predetermined volume of air.

10. In combination with a chlorine receptacle placed underground, a tube partly filled with a liquid, near its lower end which extends into said receptacle, said tube being provided at a portion projecting above ground with a sealing fluid, and means on said tube for indicating the displacement of the sealing fluid under the action of the weight of chlorine on the body of fluid at the other end of the tube.

11. In combination with a chlorine receptacle, means for supplying the same with chlorine, and means subject to the action of the air displaced by said chlorine in the receptacle for indicating the rate of flow of chlorine to and from said receptacle.

12. In combination with a chlorine receptacle, means for supplying chlorine to the same to displace the air within said receptacle, and fluid pressure means subject to the action of the displaced air for indicating the rate of flow of chlorine to and from said receptacle.

13. In combination with a chlorine receptacle, means for supplying the same with chlorine, a conduit extending from said receptacle, a container in communication with said conduit, a pressure indicating device communicating with said container, whereby through the fluctuation of pressure on said indicating device the volume of displaced air may be indicated.

14. In combination with a container for the fluid to be treated, a receptacle containing chlorine and placed underground, a conduit between the receptacle and container, and means above ground communicating with the chlorine receptacle for rendering visible the direction of flow of air to and from said receptacle.

15. In combination with a container for the fluid to be treated, a receptacle containing chlorine, a conduit between the receptacle and container, a bell communicating with said chlorine receptacle, and means in said bell for indicating the flow of air to and from said receptacle depending upon the withdrawal or introduction of chlorine from and to said receptacle.

16. In combination with a chlorine receptacle, means for introducing and for withdrawing chlorine to and from said receptacle, and a hermetically sealed barrel in communication with the interior of the receptacle and also in communication with the outer atmosphere.

17. In combination with a chlorine receptacle containing air, a chlorine gauging device responsive to the flow of air caused by the introduction and withdrawal of chlorine into and from the receptacle.

18. In combination with a chlorine receptacle, containing air and placed underground, a gauging device accessible above ground, the gauging device being responsive to the flow of air to and from the receptacle corresponding respectively to the withdrawal from and introduction of chlorine.

In witness whereof I affix my signature.

JAMES W. VAN METER.